United States Patent [19]

Martens et al.

[11] 3,862,995

[45] Jan. 28, 1975

[54] MANUFACTURE OF 1,1-DIFLUOROETHANE

[75] Inventors: Guy Martens, Brussels; Marcel Godfroid, Wavre, both of Belgium

[73] Assignee: Solvay & Cie, Brussels, Belgium

[22] Filed: Apr. 18, 1972

[21] Appl. No.: 245,191

[30] Foreign Application Priority Data

Apr. 28, 1971 Belgium .............................. 102762

[52] U.S. Cl. ........ 200/653.6, 260/653.7, 260/653.3, 252/447

[51] Int. Cl.... C07c 17/08, C07c 17/10, C07c 17/20

[58] Field of Search ...................... 260/653.6, 653.7

[56] References Cited

UNITED STATES PATENTS

| 1,996,115 | 4/1935 | Lazier | 260/653.6 |
| 2,005,707 | 6/1935 | Daudt et al. | 260/653.6 |

FOREIGN PATENTS OR APPLICATIONS

| 1,000,485 | 8/1965 | Great Britain | 260/653.6 |

Primary Examiner—Daniel D. Horwitz
Attorney, Agent, or Firm—Spencer & Kaye

[57] ABSTRACT

A method wherein vinyl chloride is reacted with hydrogen fluoride at temperatures between 100 and 400°C in the presence of a catalyst based on a vanadium derivative impregnated on activated carbon.

10 Claims, No Drawings

MANUFACTURE OF 1,1-DIFLUOROETHANE

BACKGROUND OF THE INVENTION

The present invention relates to a process for the manufacture of 1,1-difluoroethane by catalytic reaction, in the vapor phase, of vinyl chloride and hydrogen fluoride.

The 1,1-difluoroethane so obtained is an intermediate product suitable for the synthesis of fluorinated monomers.

Many processes relating to the reaction of vinyl chloride with hydrogen fluoride are known, but their resulting products consist in 1-chloro-1-fluoroethane (Belgian Pat. No. 739,525), a mixture of 1,1-difluoroethane with vinyl fluoride (U.S. Pat. No. 3,258,500) or a mixture of 1-chloro-1-fluoroethane, 1,1-difluoroethane and vinyl fluoride (Belgian Pat. No. 613,583). None of such processes permits the obtaining of an important yield in 1,1-difluoroethane.

SUMMARY OF THE INVENTION

It is an object of the present invention to provide a process giving an increased yield of 1,1-difluoroethane and an important conversion rate of vinyl chloride by reaction in the vapor phase of vinyl chloride with hydrogen fluoride. The reaction is particularly rapid; moreover, the uninteresting products as the result of a secondary reaction are obtained in minor proportions.

The process of the invention for the catalytic fluorination in the vapor phase of vinyl chloride with hydrogen fluoride, wherein vinyl chloride is brought into reaction with hydrogen fluoride, is performed at temperatures comprised between 100° and 400°C, in the presence of a catalyst based on a vanadium derivative impregnated on activated carbon.

DESCRIPTION OF THE PREFERRED EMBODIMENTS

As vanadium derivative, one may use a tri-, tetra- or pentavalent vanadium oxide, hydroxide, halide (fluoride, chloride or bromide), oxyhalide (oxyfluoride, oxychloride or oxybromide) or any other salt (sulphide, sulphate, nitrate, carbonate, phosphate, phosphite...) or their mixture. The vanadium halides or oxyhalides of tri-, tetra- or pentavalent vanadium are particularly suitable and are preferred.

Different types of activated carbon may be used as support, such as for example activated carbons which present specific surfaces comprised between 10 and 1,500 $m^2$ per g, pore diameters between 20 and 200 A, and an internal porosity from 40 to 80 percent. The activated carbon may be in the form of powder or granules.

The activated carbon is generally impregnated by 1 to 40 percent by weight, and preferably by 5 to 25 percent by weight of vanadium of the total of the weights of activated carbon and vanadium. It may be also impregnated by a vanadium salt and another compound consisting in one or more other metals.

The impregnation of the activated carbon may be carried out by different methods. When the vanadium compound is in liquid form or is easily liquefiable, the activated carbon is sprinkled with or immersed in the liquid vanadium compound. An easily vaporizable vanadium compound is distilled or sublimated onto the surface of the active carbon, while stirring the latter to avoid agglomeration of the support particles. According to other processes, the activated carbon is immersed in or sprinkled with a solution of the vanadium compound in water or in any other convenient solvent. It is also possible to pass the solution over the activated carbon kept in a fluidized state.

In certain cases, the activated carbon may also be impregnated by inert particles, such as for instance unimpregnated active carbon or graphite etc., in order to control the reaction temperature more easily.

The impregnated support, diluted or not by an inert material, may be used in fixed, mobile or fluidized bed.

The impregnated support placed into the reactor is advantageously treated with gaseous, anhydrous hydrogen fluoride, optionally diluted by an inert gas such as nitrogen, at temperatures comprised between 20° and 250°C, and preferably 30° and 170°C.

The molar ratio vinyl chloride/hydrogen fluoride is generally comprised between 1/0.5 and 1/20, and preferably between 1/1 and 1/10. The reagents may optionally be diluted by inert gases such as nitrogen, carbon dioxide.

The reaction temperature is maintained between 100° to 400°C, and preferably 150° to 300°C. Atmospheric, superatmospheric or subatmospheric pressures may be utilized. Generally pressures of between 0.5 and 20 $kg/cm^2$ are employed.

The reaction contact time depends on the reaction temperature and/or the desired conversion rate of vinyl chloride; it is generally comprised between 0.1 and 200 seconds, and preferably between 1 and 100 seconds.

The reaction mixture, coming from the reactor, contains essentially 1,1-difluoroethane, hydrogen chloride, small quantities of 1-chloro-1-fluoroethane and vinylidene fluoride as well as unconverted vinyl chloride and hydrogen fluoride, and optionally inert diluents. The unconverted vinyl chloride and hydrogen fluoride as well as the possible inert products are recycled into the reactor. In order to increase the yield in 1,1-difluoroethane, 1-chloro-1-fluoroethane and vinyl fluoride may also be recycled into the reactor.

The process according to the invention allows the obtaining of an increased yield in 1,1-difluoroethane with respect to the converted vinyl chloride. It also allows the obtaining of an important conversion rate of vinyl chloride.

Further illustrative of the present invention are the following examples:

EXAMPLE 1

44.8 g of $VCl_3$ were dissolved in 110 g of $H_2O$. The so obtained solution was completely used to impregnate by sprinkling 190 g of activated carbon APC 3 (produced by CEBCA), grain dimensions 3–5 mm; specific surface: 1,300 $m^2/g$; average pore diameter: 24 A. The impregnation was realized in several runs with intermediate dryings at room temperature under nitrogen atmosphere. The catalyst was introduced into the reactor, disposed in a fixed bed and dried at 100°C, for 3 hours. After that, it was treated by a mixture of hydrogen fluoride (4 mol/h) and nitrogen (2 mol/h) for several hours (5 to 10H). During this treatment, the temperature was progressively increased from 25° to 175°–200°C. The catalyst was then ready to be used.

The reactor was constituted by an Inconel tube (internal diameter = 2.54 cm; length: 200 cm) fitted with a thermometric axial sheath. It was heated electrically with the aid of a fluidized bed containing sand.

Vinyl chloride and hydrogen fluoride were introduced into the reactor. Table 1 shows the obtained results.

Table 1

| Test no. | | 1 | 2 | 3 | 4 | 5 |
|---|---|---|---|---|---|---|
| Temperature, °C | | 175 | 225 | 225 | 225 | 250 |
| Molar ratio HF/CH$_2$=CHCl at the inlet | | 3 | 3 | 4 | 3 | 3 |
| Contact time, seconds | | 5 | 5 | 5 | 16 | 5 |
| Conversion, mol % of vinyl chloride | | 38.5 | 50.6 | 49.3 | 64.7 | 46.5 |
| Composition of the products obtained mol % | CHClF-CH$_3$ | 10.9 | 4.1 | 3.9 | 3.8 | 3.2 |
| | CHF$_2$-CH$_3$ | 86.8 | 90.6 | 90.4 | 91.1 | 84.3 |
| | CHF=CH$_2$ | 0.9 | 2.8 | 2.7 | 2.3 | 11.5 |
| | CHCl$_2$-CH$_3$ | — | — | — | — | — |
| | CH≡CH | — | — | — | — | — |
| | Sundry | 1.4 | 2.5 | 3.0 | 2.8 | 1.0 |

As indicated in Table 1, molar yields of 1,1-difluoroethane higher than 90 percent may be obtained, the conversion rate of vinyl chloride being more than 60 percent.

EXAMPLE 2

By way of comparison, the hydrofluorination of vinyl chloride by hydrogen fluoride has been carried out in the presence of vanadium chloride deposited on alumina.

76.2 g of VCl$_3$ were dissolved in 110 g of H$_2$O. The solution so prepared was used to impregnate by sprinkling 500 g of alumina γ; the impregnation was realized in several runs with intermediate dryings, at room temperature under nitrogen atmosphere. The catalyst was introduced in the reactor disposed in fixed bed and dried at 130°C, for 4 hours under nitrogen atmosphere. Then it was treated by a mixture of hydrogen fluoride (6 mol per hour) and nitrogen (2 mol per hour) during 9 hours. During this treatment, the temperature was progressively increased from 40° to 130°C. The catalyst was then ready to be used.

The reactor was constituted by an Inconel tube (internal diameter = 2.54 cm; length = 200 cm) fitted with an axial thermometric sheath. It was electrically heated by a fluidized bed containing sand.

Vinyl chloride and hydrogen fluoride were introduced into the reactor. The results obtained are set forth in Table 2; they are designated by R in order to indicate that it concerns comparison tests, their number being the same as the number of the tests indicated in Table 1, to which they have to be compared.

Table 2

| Test no. | | 2 R | 4 R |
|---|---|---|---|
| Temperature, °C | | 225 | 225 |
| Molar ratio HF/CH$_2$=CHCl | | 3 | 3 |
| Contact time, seconds | | 5 | 21 |
| Vinyl chloride conversion, mol % | | 19.5 | 20.6 |
| Composition of the products obtained mol % | CHClF-CH$_3$ | 15.0 | 11.2 |
| | CHF$_2$-CH$_3$ | 80.7 | 83.1 |
| | CHF=CH$_2$ | 2.8 | 2.8 |
| | Sundry | 1.5 | 2.8 |

The comparison of the results given in Tables 1 and 2, and among others tests 2 and 2 R as well as 4 and 4 R, shows that a better conversion rate of vinyl chloride is obtained when activated carbon impregnated by vanadium trichloride is used (test 2, 50.6 percent; test 4, 64.7 percent) than when alumina impregnated by vanadium trichloride is used (test 2 R, 19.5 percent; test 4 R, 20.6 percent) and also that a higher yield in 1,1-difluoroethane is obtained when using the catalyst according to the invention (test 2, 90.6 percent; test 4, 91.1 percent) than when using alumina impregnated by vanadium trichloride (test 2 R, 80.7 percent; test 4 R, 83.1 percent), under practically the same experimental conditions.

It will be understood that the above description of the present invention is susceptible to various modifications, changes and adaptations, and the same are intended to be comprehended within the meaning and range of equivalents of the appended claims.

We claim:

1. A vapor-phase process for producing 1,1-difluoroethane by catalytic fluorination of vinyl chloride with hydrogen fluoride, comprising reacting vinyl chloride with hydrogen fluoride, at a reaction temperature between 100° and 400°C, in the presence of a catalyst which is catalytically active in vapor-phase fluorination of vinyl chloride with hydrogen fluoride and which is a vanadium-derivative-impregnated activated carbon, the vanadium derivative comprising tri-, tetra- or pentavalent vanadium in the form of at least one member selected from the group consisting of vanadium oxide, vanadium hydroxide, vanadium halide, vanadium oxyhalide sulfide, sulfate, nitrate, carbonate, phosphate and phosphite.

2. A process according to claim 1, wherein the reaction temperature is between 150° and 300°C.

3. A process according to claim 1, wherein the activated carbon contains from 1 to 40 percent by weight of vanadium.

4. A process according to claim 3, wherein the activated carbon contains from 5 to 25 percent by weight of vanadium.

5. A process according to claim 3, wherein the vanadium derivative is an halide or oxyhalide of tri-, tetra- or pentavalent vanadium.

6. A process according to claim 1, wherein the catalyst is treated with hydrogen fluoride before the reacting.

7. A process as claimed in claim 3, wherein the vanadium derivative is trivalent vanadium and the activated carbon has a specific surface between 10 and 1,500m$^2$ per g and pore diameters between 20 and 200 A.

8. A process as claimed in claim 7, wherein the catalyst is treated with HF before the reacting, and the molar ratio HF/CH$_2$=CHCl during the reacting is from 3 to 4 with a contact time of at least 5 seconds at a temperature of 225°C.

9. A process as claimed in claim 8, wherein the activated carbon has a specific surface of 1,300 m$^2$/g and an average pore diameter of 24 A.

10. A vapor-phase process according to claim 1 which comprises contacting a mixture of vinyl chloride and hydrogen fluoride with a catalytically-effective amount of the catalyst at a reaction temperature between 100° and 400°C; said catalyst consisting essentially of tri-, tetra- or pentavalent vanadium impregnated on activated carbon, and the vanadium being in the form of at least one member selected from the group consisting of vanadium oxide, vanadium hydroxide, vanadium halide, vanadium oxyhalide, vanadium sulphide, vanadium sulphate, vanadium nitrate, vanadium carbonate, vanadium phosphate and vanadium phosphite.

* * * * *